UNITED STATES PATENT OFFICE.

ALFRED MONNIER, OF CAMDEN, NEW JERSEY.

IMPROVEMENT IN THE MANUFACTURE OF SULPHURIC ACID.

Specification forming part of Letters Patent No. 17,976, dated August 11, 1857; Reissue No. 502, dated October 6, 1857.

*To all whom it may concern:*

Be it known that I, ALFRED MONNIER, of the city of Camden, and State of New Jersey, have invented a new and useful Improvement in the Manufacture of Sulphuric Acid from Iron Pyrites (sulphuret of iron) or other Native Metallic Sulphurets; and I hereby declare the following to be a full and exact description of the same.

Heretofore sulphuric acid has been manufactured by burning sulphur with a free accession of atmospheric air, and thus forming sulphurous acid ($SO_2$) which is united with oxygen obtained by burning nitrate of potash or nitrate of soda. Sometimes sulphuric acid has been manufactured from metallic sulphuret or pyrites by heating it in close retorts and distilling over the sulphur, and afterward burning the sulphur so obtained with oxygen derived as in the other process; but in this way only thirty per cent. of the sulphur contained in the pyrites could be extracted. Another mode of treating pyrites was to burn the pyrites in a furnace furnished with a free supply of oxygen by the draft of a chimney, or by a blower. In this way only forty per cent. of the sulphur could be obtained in the form of sulphurous acid from the metallic sulphurets. A third mode of treating the pyrites or sulphuret was by decomposing the sulphuret with a current of heated steam, and thus obtaining sulphureted hydrogen, (SH.) This was then collected in a gasometer and burned, forming sulphurous acid and water, which sulphurous acid so obtained was oxidized, as above stated.

My improvement has for its object the manufacture of sulphuric acid from pyrites or any of the native metallic sulphurets, whether simple or compound sulphurets—such as sulphuret of iron, sulphuret of copper, sulphuret of nickel, sulpheret of zinc, &c.—and I treat the sulphuret as follows: If the native sulphuret of iron is employed, then I pulverize the sulphuret of iron and mix it thoroughly with from thirty-three to seventy-five per cent. of its weight of either caustic soda, carbonate of soda, sulphuret of sodium, sulphate of soda, or with corresponding compounds of potash, or with sulphate of lime, sulphate of baryta, sulphate of strontia, or sulphate of iron. To this compound a sufficient quantity of water is added to keep it moist, and the mixture is retained in a state of moisture for eight or ten days, and is afterward molded into blocks of any convenient size or shape. When it is desired to use these blocks, they are to be heated so as to expel the moisture. This expulsion of the water also leaves the mass in a porous state and facilitates its combustion.

If it is desired to employ the mixture at once, a small quantity of water may be employed, sufficient to make the mass coherent, and this mixture is immediately made into blocks. These blocks are burned in the same manner in which pure sulphur is ordinarily burned, or they will burn better in a muffle, heat being supplied through a grate. This compound burns very freely, and all, or nearly all, of the sulphur of the pyrites is converted into sulphurous acid, and is afterward caused to combine with oxygen supplied in the ordinary manner of making sulphuric acid—viz., from nitrate of potash, or nitrate of soda, or nitric acid. When caustic soda, sulphuret of sodium, or sulphate of soda, carbonate of soda, or either of the corresponding salts of potash are employed, the residue, after the sulphur has been converted into sulphurous acid, will contain sulphate of soda, or a salt of potash and peroxide of iron, with some sulphate of iron. The sulphates can be dissolved in water, and after concentration or evaporation to dryness they may be used again for the decomposition of a fresh quantity of sulphuret of iron or pyrites.

The sulphate of iron, or the sulphates of other metals which are formed in more or less quantity, are very advantageous, by reason of their reducing the quantity of nitrate of potash, nitrate of soda, necessary to be used in the formation of sulphuric acid.

When the native sulphuret of iron treated contains sulphuret of copper, nickel, cobalt, &c., by applying more or less heat those metals will remain in the residue as oxides, sulphates, or sulphurets, either simple or compound. If strong heat is employed, oxides will be produced in large quantity, but only very little sulphate. If sufficient heat, but of short duration, is applied, the residue will contain the iron in the state of an oxide, and the other metals as sulphurets, and only with a small quantity of sulphates; but by proper regulation of the heat the iron will be nearly all oxidized, and the other metals will be mostly converted into sulphates, which, when dissolved in water, can be treated as may seem best, either for the extraction of those metals or for the decomposition of a fresh quantity of native sulphurets, as above described. When sulphate of iron is used in the first instance with the pyrites, the residue is peroxide of iron only; or if sulphate of lime, of strontia, or of baryta be employed, the residue will be sulphate of lime, of strontia, or of baryta mixed with peroxide of iron. If sulphuret of zinc or analogous sulphurets be employed, the above-mentioned process is the same, except that when it is desired to obtain the oxide or sulphate more pure the sulphate of the metals under treatment might be substituted for the sulphate of iron.

Instead of using caustic soda, sulphuret of sodium, sulphate of soda, or sulphate of iron, or either of the salts of potash above named, in the solid state, in the first stage of the process these can be used in the state of a concentrated solution. The refuse or oxide of iron which remains after the process can be used as a paint. Either of the salts above mentioned, and perhaps some salts not mentioned above, could be used in the preliminary treatment of the pyrites; but the sulphate of soda is the most advantageous and economical.

The advantage of my improved process, above described, is that all or nearly all the sulphur contained in the sulphuret of iron or other metallic sulphuret can be converted into sulphuric acid, thus effecting a great economy in the manufacture of that acid. Instead of pulverizing the metallic sulphurets as found native, and mixing them immediately with either of the substances above mentioned, in the first instance, the native sulphuret might be partially reduced by a simple roasting or fusion, and the residue treated by pulverizing and mixing it, as above described.

Having thus described my improved process, what I claim, and desire to secure by Letters Patent, is—

The process of preparing native metallic sulphurets by pulverizing them, and mixing them with the substances above described, in order to extract all or nearly all the sulphur from them for the purpose of making sulphuric acid.

ALFRED MONNIER.

Witnesses:
J. E. SHAW,
J. H. B. JENKINS.